United States Patent
Wang et al.

(10) Patent No.: US 12,412,083 B2
(45) Date of Patent: Sep. 9, 2025

(54) AUTOMATIC HYBRID QUANTIZATION FOR DEEP NEURAL NETWORK

(71) Applicant: International Business Machines Corporation, Armonk, NY (US)

(72) Inventors: Tao Wang, Beijing (CN); Chang Xu, Beijing (CN); Chao Xue, Beijing (CN); Qing Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 17/118,683

(22) Filed: Dec. 11, 2020

(65) Prior Publication Data

US 2022/0188626 A1 Jun. 16, 2022

(51) Int. Cl.
*G06N 3/045* (2023.01)
*G06F 7/483* (2006.01)
*G06N 3/08* (2023.01)

(52) U.S. Cl.
CPC .............. *G06N 3/08* (2013.01); *G06F 7/483* (2013.01); *G06N 3/045* (2023.01)

(58) Field of Classification Search
CPC .......... G06N 3/045; G06N 3/08; G06F 7/483
See application file for complete search history.

(56) References Cited

U.S. PATENT DOCUMENTS

2019/0251445 A1 8/2019 Movshovitz-Attias

FOREIGN PATENT DOCUMENTS

CN 108334945 A 7/2018

OTHER PUBLICATIONS

Wang et al., Design Flow of Accelerating Hybrid Extremely Low Bit-width Neural Network in Embedded FPGA, Oct. 2018. (Year: 2018).*
Liu et al., MetaPruning: Meta Learning for Automatic Neural Network Channel Pruning, Aug 2019. (Year: 2019).*
Wang et al., HAQ: Hardware-Aware Automated Quantization with Mixed Precision, Apr 2019. (Year: 2019).*
He et al., "AMC: AutoML for Model Compression and Acceleration on Mobile Devices", arXiv:1802.03494v4 [cs.CV] Jan. 16, 2019, 17 pages.
Liu et al., "MetaPruning: Meta Learning for Automatic Neural Network Channel Pruning", arXiv: 1903.10258v3 [cs.CV] Aug. 14, 2019, 10 pages.

(Continued)

*Primary Examiner* — Marshall L Werner
(74) *Attorney, Agent, or Firm* — Harrity & Harrity, LLP

(57) ABSTRACT

Methods, computer program products, and/or systems are provided that perform the following operations: obtaining a target neural network structure and constraints for a target neural network; generating a meta learning network having an associated quantization function based, at least in part, on the target neural network structure; training the meta learning network based, at least in part, on providing a hybrid quantization vector as input to the meta learning network and providing a training dataset to the target neural network; obtaining a plurality of hybrid quantization vectors; determining a new hybrid quantization vector from the plurality of hybrid quantization vectors; and retraining the trained meta learning network based, at least in part, on providing the new hybrid quantization vector as input to the trained meta learning network.

20 Claims, 7 Drawing Sheets

(56) References Cited

OTHER PUBLICATIONS

Long et al., "A Novel Low-Bit Quantization Strategy for Compressing Deep Neural Networks", Hindawi, Computational Intelligence and Neuroscience vol. 2020, Article ID 7839064, 7 pages, <https://doi.org/10.1155/2020/7839064>.

Wang et al., "Automatic low-bit hybrid quantization of neural networks through meta learning", arXiv:2004.11506v1 [cs.LG] Apr. 24, 2020, 8 pages, Grace Period Disclosure document.

Wang et al., "Design Flow of Accelerating Hybrid Extremely Low Bit-width Neural Network in Embedded FPGA", arXiv:1808.04311v2 [cs.DC] Oct. 25, 2018, 7 pages.

Wang et al., "HAQ: Hardware-Aware Automated Quantization with Mixed Precision", arXiv:1811.08886v3 [cs.CV] Apr. 6, 2019, 10 pages.

Wu et al., "PocketFlow: An Automated Framework for Compressing and Accelerating Deep Neural Networks", 32nd Conference on Neural Information Processing Systems (NIPS 2018), Montréal, Canada, 5 pages.

Yang et al., "Automatic Neural Network Compression by Sparsity-Quantization Joint Learning: A Constrained Optimization-based Approach", arXiv:1910.05897v3 [cs.LG] Dec. 6, 2019, 16 pages.

* cited by examiner

AUTOMATIC HYBRID QUANTIZATION FOR DEEP NEURAL NETWORK

STATEMENT ON PRIOR DISCLOSURES BY AN INVENTOR

The following disclosure(s) are submitted under 35 U.S.C. § 102(b)(1)(A):

(1) Tao Wang, Junsong Wang, Chang Xu, Chao Xue, "Automatic low-bit hybrid quantization of neural networks through meta learning", arXiv:2004.11506v1 [cs.LG] Apr. 24, 2020, 8 pages.

BACKGROUND

The present invention relates generally to the field of neural networks, and more particularly to model quantization for a deep neural network.

In general, model quantization can be used to improve model compression and reduce latency, for example, in neural networks.

SUMMARY

According to an aspect of the present invention, there is a method, computer program product and/or system that performs the following operations (not necessarily in the following order): obtaining a target neural network structure and constraints for a target neural network; generating a meta learning network having an associated quantization function based, at least in part, on the target neural network structure; training the meta learning network based, at least in part, on providing a hybrid quantization vector as input to the meta learning network and providing a training dataset to the target neural network; obtaining a plurality of hybrid quantization vectors; determining a new hybrid quantization vector from the plurality of hybrid quantization vectors; and retraining the trained meta learning network based, at least in part, on providing the new hybrid quantization vector as input to the trained meta learning network.

DETAILED DESCRIPTION

Figure 1:
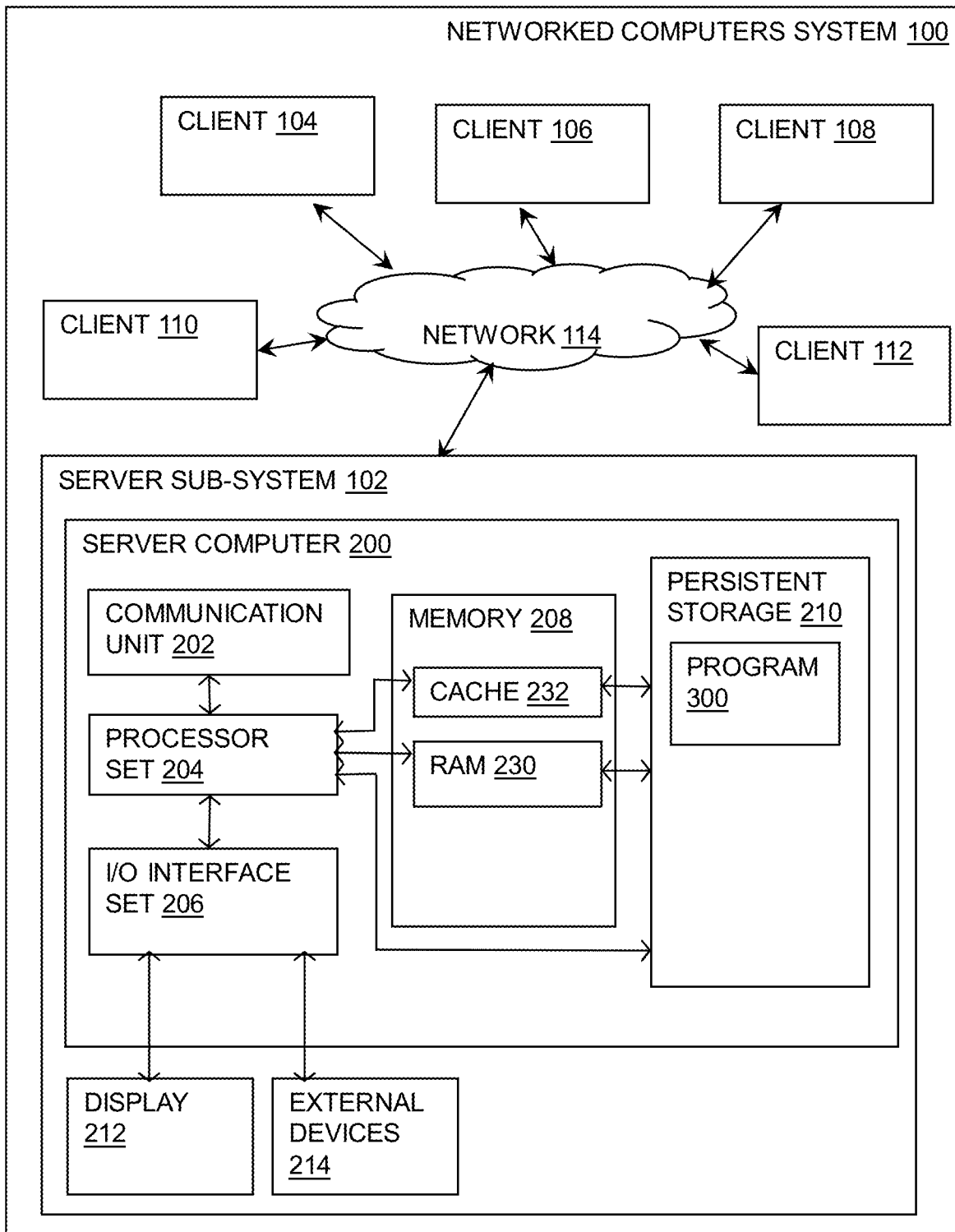
FIG. 1 is a block diagram view of a first embodiment of a system, according to the present invention.

According to aspects of the present disclosure, systems and methods can provide for automatic hybrid quantization of networks, such as neural networks. In particular, systems and methods of the present disclosure can provide for training and using a meta learning network, along with a quantization function, to generate quantized weights for a target network, such as a deep neural network (DNN). The systems and methods can provide for applying various quantization vectors as input to a meta learning network and searching for an optimal hybrid quantization policy to meet constraints for the target neural network and achieve high performance, for example, by applying a genetic algorithm and/or the like to search for an optimal hybrid quantization vector. Further, systems and methods of the present disclosure can provide for retraining and/or finetuning the meta learning network using an optimal hybrid quantization policy, for example, to further improve the performance of the quantized target network. Additionally, some embodiments of the present disclosure can provide for using a well pretrained network (e.g., teacher network) to supervise training of the network.

Model quantization can be used to improve model compression and reduce latency, for example, in neural networks. Generally, model quantization can be used to compress and accelerate deep neural network (DNN) inference. Often, this can be especially important when deploying models to devices with limited computation capacity and/or power consumption budget, such as, for example, edge devices, Internet of Things (IoT) devices, and/or the like.

Many quantization approaches only investigate uniform bit width quantization across all layers of DNN, which can be sub-optimal, for example, under certain compression constraints. The precision of each layer in a network has a different influence on the final accuracy and can also vary with the architectures of the deep networks. Often, conventional hybrid quantization of DNN can require domain experts and some empirical rules to explore a best (e.g., optimal, etc.) hybrid quantization policy. Systems and methods of the present disclosure provide for automatic hybrid quantization that can allow for deeper compression while maintaining higher performance, even in low bit cases.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can include functions for model quantization, training a neural network to for hybrid quantization, generating quantized weights for a target network, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

EXAMPLE EMBODIMENTS

Figure 2:
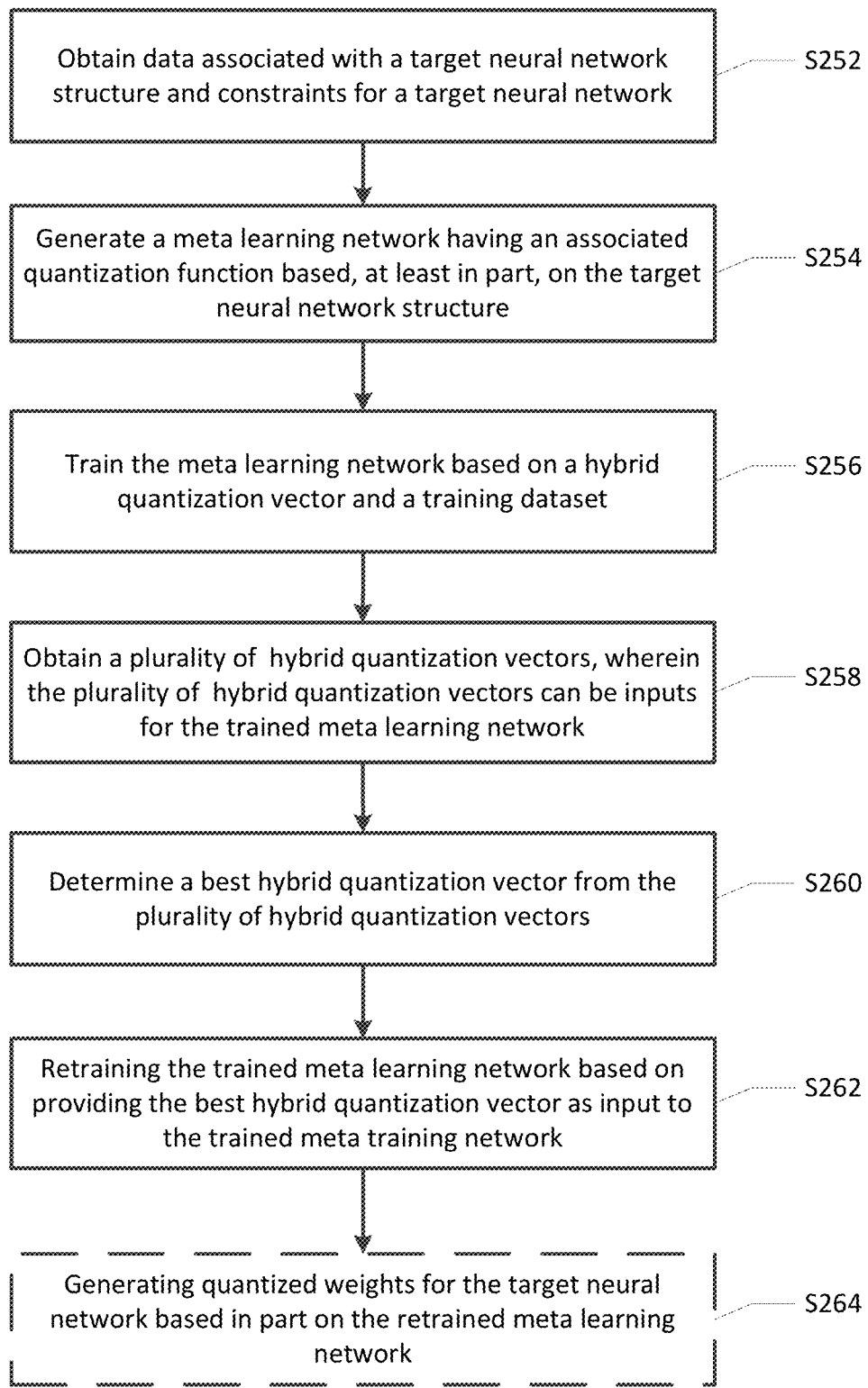
FIG. 2 is a flowchart showing a first embodiment method performed, at least in part, by the first embodiment system.

FIG. 2 shows flowchart 250 depicting a computer-implemented method, according to embodiment(s) of the present invention. Regarding FIG. 2, one or more flowchart blocks may be identified with dashed lines and represent optional steps that may additionally be included, but which are not necessarily required, in the depicted embodiments.

As illustrated in FIG. 2, in some embodiments, operations for training a meta learning network for hybrid quantization of target networks (e.g., generating quantized weights for layers of a target network) begin at operation S252, where a computing system (e.g., server computer 200 of FIG. 1 or the like) obtains data associated with a target neural network structure and constraints for a target neural network. As an example, user input can be obtained regarding a target network structure and constraints. Constraints can include various types of constraints such as estimated constraints, hardware response, and/or the like, for example. In various embodiments, constraints can include one or more of model size, latency, energy consumption budget, and/or the like.

Processing proceeds to operation S254, where the computing system (e.g., server computer 200 of FIG. 1 or the like) can generate a meta learning network along with an associated quantization function. In some embodiments, a meta learning network can be constructed based, at least in part, on the target neural network structure and use a quantization module/function (Q), such as further described in regard to FIGS. 6 and 7. In some embodiments, the quantization function (Q) can push the neural network weights to nearby quantization levels.

Processing proceeds to operation S256, where the computing system (e.g., server computer 200 of FIG. 1 or the like) can train the meta learning network. The meta learning network can be trained based, at least in part, on providing a hybrid quantization vector (e.g., random hybrid quantization vector, etc.) as input to the meta learning network and providing a training dataset to the target neural network. In some embodiments, a hybrid quantization vector can the bit width number of every layer of the target network. In some embodiments, once the meta learning network is well trained, the meta learning network can predict weights of target networks for various hybrid quantization vector inputs. As such, the meta learning network just needs to be trained once and then best (e.g., optimal, etc.) hybrid quantization policies can be quickly determined for different constraints under the same workflow. In some embodiments, the training process can be supervised by a well pretrained network (e.g., a teacher network, etc.). A well pretrained network (e.g., a teacher network) can assist in converging meta learning network and may further provide for improved performance of a quantized target network.

Processing proceeds to operation S258, where the computing system (e.g., server computer 200 of FIG. 1 or the like) can obtain a plurality of hybrid quantization vectors, wherein the plurality of hybrid quantization vectors can be inputs for the trained meta learning network. The hybrid quantization vectors can further be used to control the quantization function.

Processing proceeds to operation S260, where the computing system (e.g., server computer 200 of FIG. 1 or the like) can determine a best (e.g., optimal, new, etc.) hybrid quantization vector (e.g., hybrid quantization policy) from the plurality of hybrid quantization vectors. In some embodiments, determining a best (e.g., optimal, etc.) hybrid quantization vector based, at least in part, on the constraints for the target neural network. For example, the input hybrid quantization vectors can be searched to determine a best (e.g., optimal, etc.) hybrid quantization vector that makes a quantized target neural network meet the provided constraints (e.g., model size, latency, energy consumption budget, etc.). In some embodiments, evolution or genetic search algorithms can be applied to assist in determining a best (e.g., optimal, etc.) hybrid quantization vector, for example, that meets the provided constraints and provides for a high or highest level of performance. In some embodiments, a best (e.g., optimal, etc.) hybrid quantization vector determination can be based, at least in part, on quantized weights that would be provided as output from the trained meta learning network for each of the input plurality of hybrid quantization vectors.

Processing proceeds to operation S262, where the computing system (e.g., server computer 200 of FIG. 1 or the like) can retrain and/or fine-tune the previously trained meta learning network based, at least in part, on providing the determined best (e.g., optimal, new, etc.) hybrid quantization vector as input to the trained meta training network (e.g., along with providing the training dataset as input to the quantized target neural network). For example, in some embodiments, the determined best (e.g., optimal, etc.) hybrid quantization vector can be provided as input to retrain the meta learning network from scratch. In some embodiments, retraining the meta learning network from scratch can help avoid a local minimum. Additionally, or alternatively, in some embodiments, the determined best (e.g., optimal, etc.) hybrid quantization vector can be provided as input to finetune the trained meta learning network and improve the performance of the target quantized neural network. In some embodiments, the retraining process can be supervised by a well pretrained network (e.g., a teacher network, etc.) which may provide for improved performance of the quantized target neural network.

Some embodiments can provide the ability to realize extremely low-bit hybrid quantization. In some embodiments, a well-trained meta learning network can provide for automatically determining hybrid quantization for a neural network, and as such expert experience may not be needed to perform the quantization, for example.

Optionally, in some embodiments, processing may continue to operation S264, where the computing system (e.g., server computer 200 of FIG. 1 or the like) can generate quantized weights for the target neural network based in part on the retrained meta learning network. For example, final predicted quantized weights can be provided by the meta learning network and loaded to a corresponding layer (e.g., convolutional layer, fully connected layer, linear layer, etc.) in the target neural network. In some embodiments, the quantized target neural network can then be exported with the quantized weight values.

Figure 3:
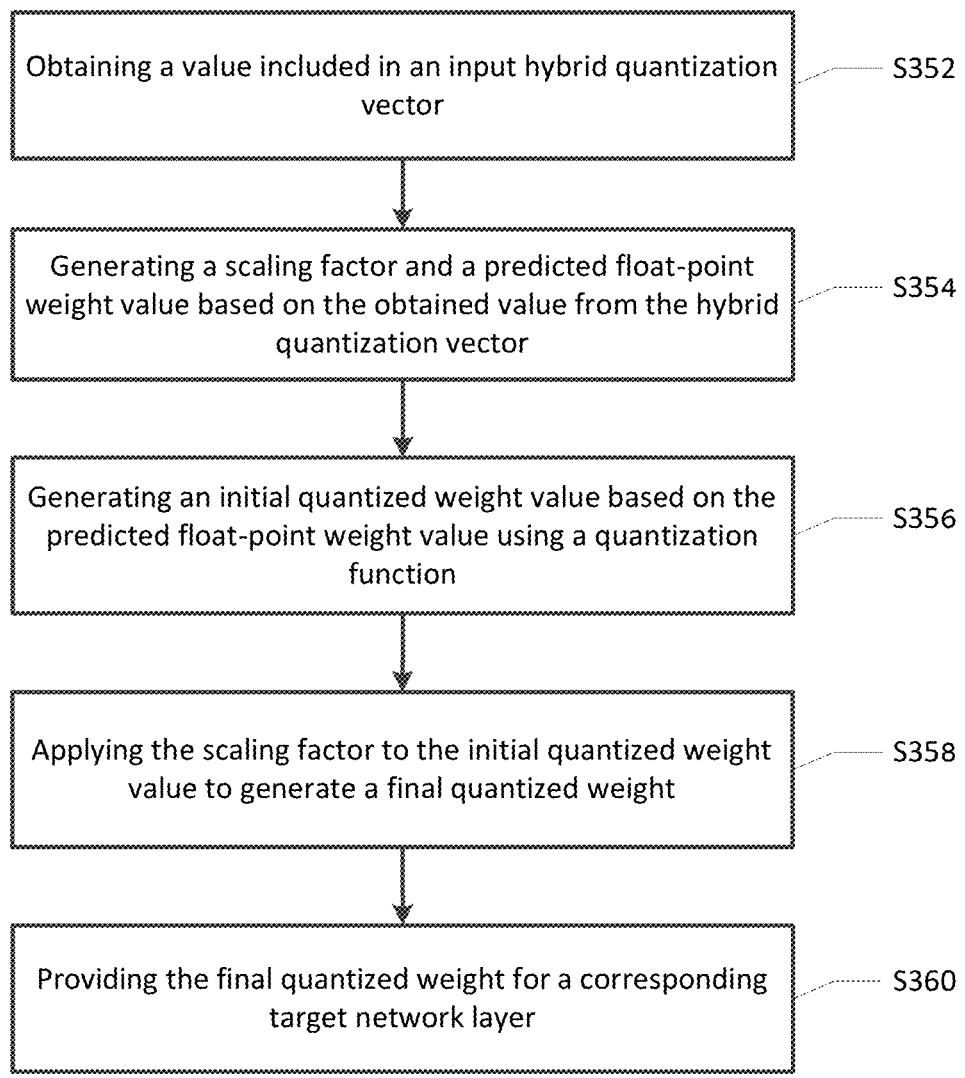
FIG. 3 is a flowchart showing an embodiment of a method performed, at least in part, by the first embodiment system.

FIG. 3 shows flowchart 350 depicting a computer-implemented method, according to embodiment(s) of the present invention. As illustrated in FIG. 3, in some embodiments, operations for determining quantized weights for a target network (e.g., a deep neural network, etc.) may begin at operation S352, where a computing system (e.g., server computer 200 of FIG. 1 or the like) can obtain a value included in an input hybrid quantization vector (e.g., $q_x$ of the vector $[q_1, q_2, q_3, \ldots]$). The obtained value of the input hybrid quantization vector can correspond to an input for a block of the meta learning network (e.g., as described in regard to FIGS. 5 and 6).

Processing proceeds to operation S354, where the computing system (e.g., server computer 200 of FIG. 1 or the like) can generate a scaling factor and a predicted float-point weight value based on the obtained value from the input hybrid quantization vector. For example, the obtained value of the input hybrid quantization vector can be provided as input to a block of the meta learning network. The block of the meta learning network can generate a scaling factor (e.g., $\alpha$) and a predicted float-point weight value (e.g., W) that can be used in determining a quantized weight for the corresponding layer of the target neural network. The predicted float-point weight value (e.g., W) can be provided to a quantization function associated with a meta learning network.

Processing proceeds to operation S356, where the computing system (e.g., server computer 200 of FIG. 1 or the like) can generate an initial quantized weight value based on the predicted float-point weight value using a quantization function. The value from the input hybrid quantization vector (e.g., q) can also be applied to control the quantization function (e.g., Q). For example, the predicted float-point weight value (e.g., W) can be provided to the quantization function (e.g., Q) to generate an initial quantized weight value (e.g. $\hat{W}$), along with the value from the input hybrid quantization vector (e.g., q) being provided to control the quantization function (e.g., Q).

Processing proceeds to operation S358, where the computing system (e.g., server computer 200 of FIG. 1 or the like) can apply the scaling factor to the initial quantized weight value to generate a final quantized weight. For example, the scaling factor (e.g., α) can be applied to the initial quantized weight value (e.g. $\hat{W}$) to generate a final quantized weight (e.g., $W_{layer}$) for the corresponding layer of the target neural network, where $W_{layer}=\alpha*\hat{W}$.

Processing proceeds to operation S360, where the computing system (e.g., server computer 200 of FIG. 1 or the like) can provide the final quantized weight for a corresponding target network layer. For example, the final quantized weight (e.g., $W_{layer}$) can be loaded to a corresponding layer e.g., convolutional layer, linear layer, etc.) in the target neural network, such as, using a reshape operation.

FURTHER COMMENTS AND/OR EMBODIMENTS

Figure 4:
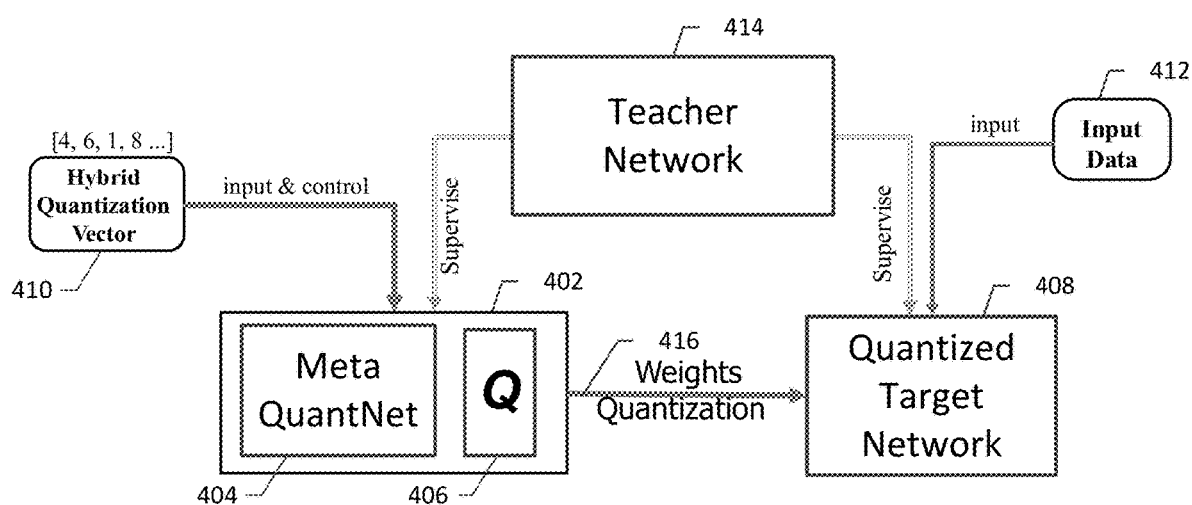
FIG. 4 is a block diagram showing an example architecture for automatic hybrid quantization, according to embodiments of the present invention.

FIG. 4 is a block diagram showing an example architecture 400 for automatic hybrid quantization, according to embodiments of the present invention. As described above, embodiments of the present disclosure can provide for using a meta learning network (e.g., meta learning network 402) for automatic hybrid quantization of a target network (e.g., target network 408), such as a deep neural network. According to aspects of the present disclosure, embodiments can provide for the target network quantized weights (e.g., quantized weights 416) to be generated by a meta learning network (e.g., meta learning network 402) rather than through traditional training/processing of the target neural network itself.

As illustrated in FIG. 4, a meta learning network 402 can be built, for example, based on a target neural network structure. The meta learning network 402 can include a stack of meta network blocks 404 along with an associated quantization function 406. For training of the meta learning network 402, a hybrid quantization vector 410 can be provided as input to the meta learning network 402 and a training data set 412 is provided as input to the target network 408. Each value included in the hybrid quantization vector corresponds to a bit width number of a layer of the target network 408. In some embodiments, as illustrated in FIG. 4, the training process can be supervised by a well pretrained network (e.g., teacher network 414). The teacher network 414 can help converge the meta learning network training and/or improve performance of the target network 408. The hybrid quantization vector 410 is also provided as a control for the quantization function 406.

Once the meta learning network 402 has been trained (e.g., to predict quantized weights for the target network 408), a plurality of hybrid quantization vectors, such as hybrid quantization vector 410, can be searched to find a best/optimal hybrid quantization vector such that the quantized target network 408 meets constraints, such as model size, latency, energy consumption budget, and/or the like. The best/optimal hybrid quantization vector can also achieve a high or highest level of performance. For example, a best/optimal hybrid quantization vector can be determined by changing the hybrid quantization vector (e.g., hybrid quantization vector 410) values while keeping meta network parameters fixed, and using an evolution or genetic search to find the hybrid quantization vector that meets the constraints for the target network (e.g., target network 408) and achieves the highest performance.

In response to determining the best/optimal hybrid quantization vector, the determined best/optimal hybrid quantization vector can be used to retrain and/or fine-tune the meta learning network 402 (e.g., along with the input data set 412). In some embodiments, the retraining/finetuning can also be supervised by the teacher network 414. Quantized weights 416 can then be generated and applied/loaded to the quantized target network 408.

Figure 5:
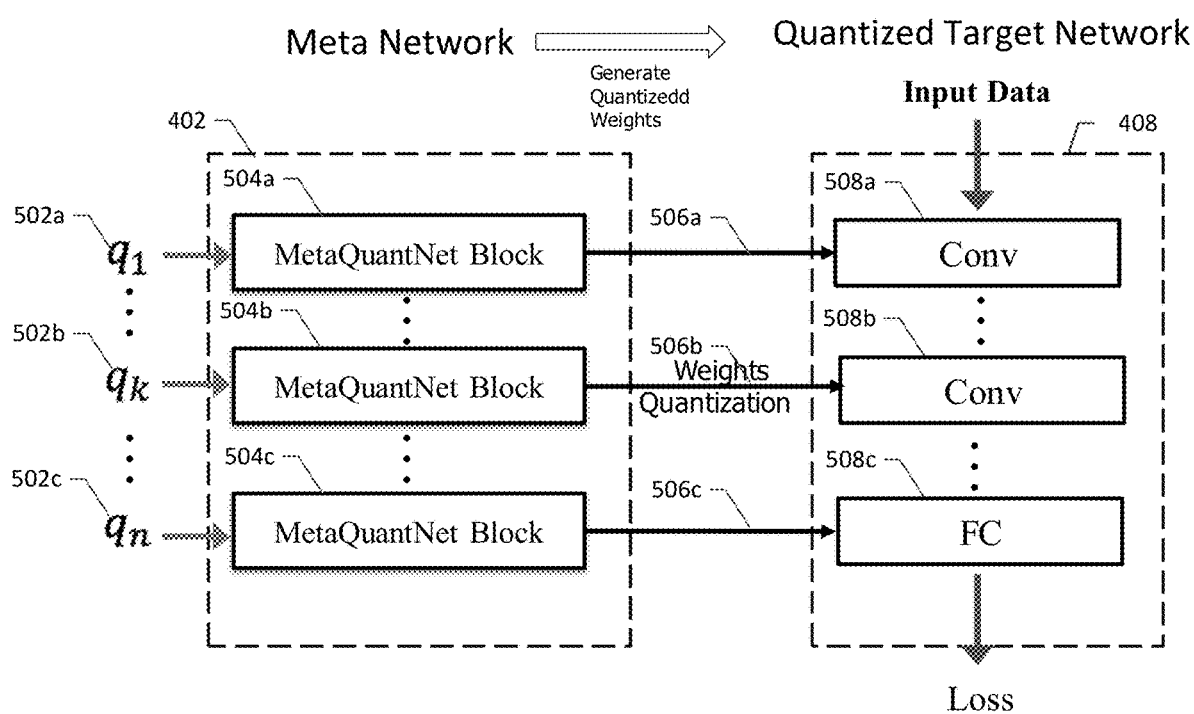
FIG. 5 is a block diagram showing an example architecture for automatic hybrid quantization, according to embodiments of the present invention.

FIG. 5 is a block diagram showing an example architecture 500 for automatic hybrid quantization, according to embodiments of the present invention. As illustrated in FIG. 5, in some embodiments, a meta learning network for use in automatic hybrid quantization, such as meta learning network 402, can include a stack of meta network blocks, such as meta network block 504a, meta network block 504b, meta network block 504c, and the like. The meta learning network 402 takes a quantization vector (e.g., value ($q_1$) 502a, value ($q_k$) 502b, value ($q_n$) 502c, etc.) as input and outputs quantized weights (e.g., quantized weight 506a, quantized weight 506b, quantized weight 506c, etc.) for a target network 408. Each value of the input quantization vector is applied as input to a meta network block and each meta network block provides output for a corresponding layer of the target network 408 (e.g., layer 508a, layer 508b, layer 508c, etc.). For example, value ($q_1$) 502a is input to meta network block 504a and meta network block 504a generates a quantized weight 506a for target network layer 508a. Similarly, value ($q_k$) 502b is input to meta network block 504b, which provides quantized weight 506b for target network layer 508b. Further, value ($q_n$) 502c is input to meta network block 504c which provides quantized weight 506c for target network layer 508c. The target network layers can be convolutional layers, fully connected layers, and/or the like.

Figure 6:
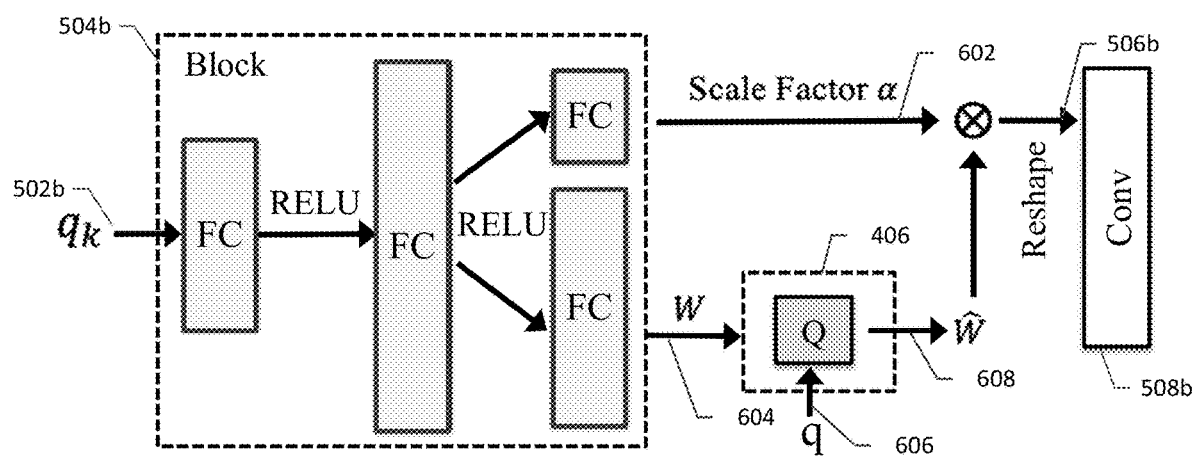
FIG. 6 is a block diagram showing an example architecture for automatic hybrid quantization, according to embodiments of the present invention.

FIG. 6 is a block diagram showing an example architecture 600 for automatic hybrid quantization, according to embodiments of the present invention. As illustrated in FIG. 6, in some embodiments, a meta network block, such as meta network block 504b takes an input of a value (e.g., value ($q_k$) 502) of an input quantization vector and outputs a quantized weight (e.g., quantized weight 506b) for a corresponding target network layer (e.g., target network layer 508b). In some embodiments, a meta network block, such as meta network block 504b, may comprise a three-layered fully connected (FC) network that takes as input one value q of a hybrid quantization vector, such as value ($q_k$) 502. In some embodiments, the meta network block 504b may include rectified linear unit (ReLU) activation function. The first layer of meta network block 504b takes the quantization vector value (e.g., $q_k$) as the input. The second hidden layer has two branch outputs that are connected to the third layer. One branch output is connected to a third layer that outputs one value as a scaling factor/parameter 602 (α). The other branch output is connected to a third layer that outputs a float weight 604 (W) to a quantization function 406.

The quantization function 406 receives the float weight 604 (W) from the third layer. The quantization function 406 receives the value q 606 from the input quantization vector to control the quantization function. The quantization function 406 generates an initial quantized weight 608 ($\hat{W}$) as output. The scaling factor/parameter 602 (α) is applied to the initial quantized weight 608 ($\hat{W}$) to generate the final quantized weight 506b for the corresponding target network layer 508b (e.g., $W_{layer}=\alpha*\hat{W}$).

Figure 7:
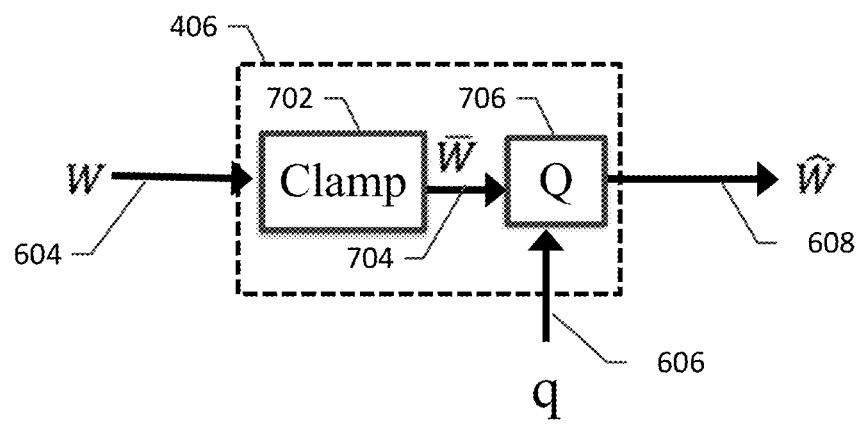
FIG. 7 is a block diagram showing an example architecture for weight quantization, according to embodiments of the present invention.

FIG. 7 is a block diagram showing an example architecture 700 for weight quantization, according to embodiments of the present invention. As illustrated in FIG. 7, in some embodiments, a quantization function (e.g., quantization module Q), such as quantization function 406, can include two functions, a clamp function 702, where $\overline{W}=Clamp(W)$ and a function $\hat{Q}$ 706, where $$\hat{W} = \hat{Q}(x, q) = \frac{1}{2^q - 1} \text{ round } ((2^q - 1)x),$$

with $$x = sc(\overline{W}) = \frac{(\overline{W} - \beta)}{\alpha}.$$

The quantization function 406 receives a float weight W as input and provides W to the clamp function 702. The clamp function 702 generates a value $\overline{W}$ 704 as output and provides $\overline{W}$ 704 to the $\hat{Q}$ function 706. The value q 606 from the input quantization vector is also provided to control the $\hat{Q}$ function 706. The $\hat{Q}$ function 706 then generates the initial quantized weight 608 $\hat{W}$ as output.

DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method, the method comprising:
    training a meta learning network, wherein the meta learning network includes an associated quantization function based, at least in part, on a target neural network structure for a target neural network that comprises multiple layers, wherein the training is based, at least in part, on use of a hybrid quantization vector as input to the meta learning network and use of a training dataset as input to the target neural network, wherein the hybrid quantization vector references a bit width number of every layer of the multiple layers of the target neural network due to each value included in the hybrid quantization vector corresponding to a respective bit width number of a corresponding layer of the multiple layers of the target neural network; and
    retraining the trained meta learning network based, at least in part, on use of a new hybrid quantization vector as input to the trained meta learning network, wherein the new hybrid quantization vector meets constraints for the target neural network.

2. The computer-implemented method of claim 1, wherein the new hybrid quantization vector further meets constraints of model size, latency, and energy consumption budget for the target neural network.

3. The computer-implemented method of claim 1, wherein the training of the meta learning network and the retraining of the trained meta learning network is supervised by a pretrained network.

4. The computer-implemented method of claim 1, the method further comprising:
    inputting into the retrained meta learning network a value from an input hybrid quantization vector to generate a final quantized weight for a layer of the target neural network, wherein the inputting into the retrained meta learning network comprises each block of a plurality of blocks of the meta learning network receiving a value from the input hybrid quantization vector to generate a scaling factor and a predicted float-point weight value.

5. The computer-implemented method of claim 4, wherein the inputting into the retrained meta learning network comprises the quantization function receiving the predicted float-point weight value to generate an initial quantized weight value.

6. The computer-implemented method of claim 5, wherein the inputting into the retrained meta learning network comprises applying the scaling factor to the initial quantized weight value to generate the final quantized weight for the layer of the target neural network.

7. The computer-implemented method of claim 1, wherein during the training the meta learning network, the hybrid quantization vector is used to control the quantization function.

8. A computer program product comprising a computer readable storage medium having program instructions stored thereon, the program instruction upon being executed by one or more processors of a computer system perform a computer-implemented method, the method comprising:

training a meta learning network, wherein the meta learning network includes an associated quantization function based, at least in part, on a target neural network structure for a target neural network that comprises multiple layers, wherein the training is based, at least in part, on use of a hybrid quantization vector as input to the meta learning network and use of a training dataset as input to the target neural network, wherein the hybrid quantization vector references a bit width number of every layer of the multiple layers of the target network due to each value included the hybrid quantization vector corresponding to a respective bit width number of a corresponding layer of the multiple layers of the target neural network; and retraining the trained meta learning network based, at least in part, on use of a new hybrid quantization vector as input to the trained meta learning network, wherein the new hybrid quantization vector meets constraints for the target neural network.

9. The computer program product of claim 8, wherein the new hybrid quantization vector further meets constraints of model size, latency, and energy consumption budget for the target neural network.

10. The computer program product of claim 8, wherein the training of the meta learning network and theretraining of the trained meta learning network is supervised by a pretrained network.

11. The computer program product of claim 8, the method further comprising:
inputting into the retrained meta learning network a value from an input hybrid quantization vector to generate a final quantized weight for a layer of the target neural network, wherein the inputting into the retrained meta learning network comprises each block of a plurality of blocks of the meta learning network receiving a value from the input hybrid quantization vector to generate a scaling factor and a predicted float-point weight value.

12. The computer program product of claim 11, wherein the inputting into the retrained meta learning network comprises the quantization function receiving the predicted float-point weight value to generate an initial quantized weight value.

13. The computer program product of claim 12, wherein the inputting into the retrained meta learning network comprises applying the scaling factor to the initial quantized weight value to generate the final quantized weight for the layer of the target neural network.

14. A computer system comprising:
one or more processors, one or more memories, and a computer readable storage medium having program instructions stored thereon, the program instructions upon being executed by the one or more processors via the one or more memories perform a computer-implemented method, the method comprising:
training a meta learning network, wherein the meta learning network includes an associated quantization function based, at least in part, on a target neural network structure for a target neural network that comprises multiple layers, wherein the training is based, at least in part, on use of a hybrid quantization vector as input to the meta learning network and use of a training dataset as input to the target neural network, wherein the hybrid quantization vector references a bit width number of every layer of the multiple layers of the target network due to each value included the hybrid quantization vector corresponding to a respective bit width number of a corresponding layer of the multiple layers of the target neural network; and retraining the trained meta learning network based, at least in part, on use of a new hybrid quantization vector as input to the trained meta learning network, wherein the new hybrid quantization vector meets constraints for the target neural network.

15. The computer system of claim 14, wherein the new hybrid quantization vector further meets constraints of model size, latency, and energy consumption budget for the target neural network.

16. The computer system of claim 14, wherein the training of the meta learning network and the retraining of the trained meta learning network is supervised by a pretrained network.

17. The computer system of claim 14, the method further comprising:
inputting into the retrained meta learning network a value from an input hybrid quantization vector to generate a final quantized weight for a layer of the target neural network, wherein the inputting into the retrained meta learning network comprises each block of a plurality of blocks of the meta learning network receiving a value from the input hybrid quantization vector to generate a scaling factor and a predicted float-point weight value.

18. The computer system of claim 17, wherein the inputting into the retrained meta learning network comprises the quantization function receiving the predicted float-point weight value to generate an initial quantized weight value.

19. The computer system of claim 18, wherein the inputting into the retrained meta learning network comprises applying the scaling factor to the initial quantized weight value to generate the final quantized weight for the layer of the target neural network.

20. The computer system of claim 14, wherein during the training of the meta learning network, the hybrid quantization vector is used to control the quantization function.

* * * * *